United States Patent Office 3,462,283
Patented Aug. 19, 1969

3,462,283
MONOFUNCTIONALLY SUBSTITUTED HYDROPHOBIC STARCH AND FILM-FORMING DISPERSIONS PREPARED THEREFROM
Erling T. Hjermstad, Cedar Rapids, and Larry C. Martin, Alburnett, Iowa, and Kenneth W. Kirby, Winston-Salem, N.C., assignors to Penock & Ford, Limited, New York, N.Y., a corporation of Delaware
No Drawing. Filed Feb. 28, 1967, Ser. No. 619,153
Int. Cl. C09j 3/06; C09d 3/20; C09k 3/00
U.S. Cl. 106—213         13 Claims

ABSTRACT OF THE DISCLOSURE

Hydrophobic starch dispersible in water as submicron sized particles to provide a film-forming dispersion is prepared by etherification of granule starch with a monofunctional etherifying agent providing the starch with ether-linked hydrophobic groups. The hydrophobic groups are alkyls of at least three carbons or aralkyls of at least seven carbons, and the starch is substituted to a level where it is essentially hydrophobic and does not gelatinize. The hydrophobic granule starch can be fragmented to subgranule particles of submicron size, which are dispersible in water to provide a film-forming dispersion.

BACKGROUND OF THE INVENTION

The hydrophobic starch product of this invention, and the dispersions prepared therefrom are useful in certain coating operations as a substitute for ordinary gelatinized starch pastes or hydrosols. The hydrophobic starches can be dispersed at relatively high solids to low viscosity sols which are capable of forming films having high dry film strength and adhesive power. The films exhibit increased water-resistance and reduced tackiness at high humidities. The starch dispersion systems have extremely low water-binding capacity, and water can be more readily removed therefrom than from normal starch paste.

Starches and starch dispersions with any or all of the properties just described have long been sought. While native, modified, and derivatized starches have been developed which have a great variety of paste rheological and film properties, there are certain deficiencies in commercial starches which have heretofore been available. For any given variety of starch, the native unmodified or undeploymerized starch is best suited to obtain maximum adhesive power and dry film strength. However, for starch to be used in higher concentrations without unworkable viscosities developing on gelatinization, the major proportion of industrial starch is degraded to a lower viscosity by acidic, oxidative or enzymic depolymerization. While this avoids unworkable paste viscosities, this lowering of the degree of polymerization also tends to lower the adhesive and filming strength of the starch. It has long been desired, therefore, to produce a starch which is relatively undepolymerized but which can form films having high dry adhesive strength without developing high viscosities in relatively high concentrations.

Another deficiency in prior commercial starches and starch derivatives is their low water-resistance, and the high sensitivity of their dried films to moisture and humidity. A great need has existed for starches which dry to films having increased water-resistance and which are strong and non-tacky at high humidities.

Another property of normal commercial starches and starch derivatives is their tendency to form hydrated sols or pastes in which the water is more or less strongly bound to the starch polymer. This water-binding, while very beneficial in some applications, is also detrimental in others since it tends to prevent the removal of water from films during drying and to cause migration of starch pastes to surfaces, for example, in internally sized board or tile. This may cause an adhesive-starved zone in the center. For certain applications, it would be highly desirable to have a starch which does not bind water and which will form a strong, dry adhesive bond or film.

SUMMARY OF THE INVENTION

Starches and starch dispersions substantially overcoming the problems and limitations described above are produced according to the present invention by first converting the starch to a hydrophobic, non-gelatinizable form. Prior to the present invention, such a treatment of starch would have been expected to make the starch substantially useless for preparing a starch paste or hydrosol. While non-gelatinizable starches have heretofore been produced by cross-linking reactions, such starches have only very minor practical applications. For example, water insoluble starches prepared by treatment of the starch with a bifunctional, cross-linking reagent have received some use, as components of infant dusting powders, since such highly inhibited starches can be sterilized by autoclaving, and they do not absorb water when applied to the body. These properties, however, disqualify the hydrophobic starches for most other uses. The hydrophobic starches of the prior art cannot be gelatinized, and have no utility in preparing water hydrosols or pastes for use as size or adhesive, for example, in paper and textile sizing, as coating binders, as corrugating adhesives, as bag adhesives, as laminating adhesives, or as remoistening adhesives. In all of these applications, the starch must be capable of forming a continuous film as its hydrated sol or paste is dried.

In accordance with the present invention, hydrophobic starches are prepared which are dispersible in water as submicron sized particles to provide a film-forming dispersion. The starch is made hydrophobic by etherification in granule form under non-gelatinizing conditions with a monofunctional etherifying agent providing the starch with ether-linked hydrophobic groups. The starch is not cross-linked or "inhibited," but the starch granule as a whole becomes hydrophobic because of the introduction of a high percentage of hydrophobic groups. For this purpose, the hydrophobic groups may be selected from alkyls of at least three carbons or aralkyls of at least seven carbons. The etherification reaction is continued until the resulting granule starch is hydrophobic and essentially non-gelatinizable. The starch is then fragmented and reduced to submicron sized particles by treatment with steam under pressure. The starch is not swollen or cooked but rather is reduced to very fine particles which are mainly in the microscopic or colloidal size range. The resulting particles of starch can be dispersed in water to form a dispersion which has the appearance of an emulsion, and which is capable of forming a continuous film when applied as a size or adhesive and dried.

As described, for example, in U.S. Patent 3,062,810, starches have heretofore been reacted with etherifying agents providing ether-linked alkyl or aralkyl groups. The etherification, however, has been carried out for other purposes than to make the starch hydrophobic, and the degree of etherification has therefore been limited so that the resulting starch product will still be readily subject to gelatinization and the formation of a conventional starch paste. The present invention is based in part on the discovery that the starch granules may be rendered hydrophobic and non-gelatinizable when etherified to a sufficiently high substitution level with etherifying agents providing hydrophobic groups. The invention is further based on the discovery, as indicated above, that while such hydrophobic starches cannot be gelatinized in the usual way, they can be fragmented and reduced to a fine state of subdivision with the resulting particles being dispersible in water to provide a dispersion which has film-forming properties even though the individual starch particles do not appear to be hydrated. Such dispersions have the appearance and properties of "emulsions" as distinguished from ordinary hydrated sols of starch in which the water is very intimately associated or bound to the starch polymer.

DESCRIPTION OF PREFERRED EMBODIMENTS

This invention involves the monofunctional etherification of ungelatinized, granule starch with etherifying agents which have a hydrophobic alkyl or aralkyl radical. The functional group which is reactive with starch to form an ether bond may be a halogen radical such as chloride or bromide, an epoxy group in which the oxygen is linked to adjacent carbon atoms, or any other radical capable of forming an ether obnd at a hydroxyl of the starch. The etherifying reagent is generally reacted with the ungelatinized granule starch under alkaline conditions. When the reaction is conducted in water, it is usually necessary to use conditions which preclude swelling of the starch during the early stages of the reactions because low-substituted starch ethers have lowered swelling temperature and increased susceptibility to gelatinization by aqueous alkali, even though the groups substituted into the starch are hydrophobic rather than hydrophilic. Swelling can be prevented by using relatively low reaction temperatures, by maintaining relatively low alkali levels, or by the addition of swelling inhibitors during early stages of the reaction or suitable combinations of these reaction conditions. On continuing the reaction with hydrophobic, monofunctional etherifying agents, the granule starch becomes increasingly insoluble in aqueous alkali. This allows for increasing the alkalinity and/or the reaction temperature without gelatinizing the starch, thus attaining fairly reasonable reaction rates with some of the more difficulty hydrolyzable alkyl halides.

Etherifying agents which react with ungelatinized granule starch in alkaline media to produce hydrophobic starch ethers include alkyl halides containing at least three carbon atoms, for example, allyl chloride or bromide, and substituted allyl halides, such as methallyl chloride; aralkyl halides, for example, benzyl chloride or bromide, p-halo benzyl chloride or bromide, or 3-chloro propenyl benzene; epoxy reagents, for example, phenyl glycidyl ether and allyl glycidyl ether; etc.

In general, the preferred etherifying agents provide the starch with ether-linked alkyl groups of at least three carbon atoms, or aralkyl groups of at least seven carbon atoms. While the alkyl groups can contain from three up to twelve carbons, alkyl groups of three to six carbons are particularly desirable. The aralkyl groups can contain from seven to twelve carbons, but preferably contain from seven to nine carbons, six of the carbons being in the form of a benzene ring. Among the hydrophobic groups which are particularly advantageous are benzyl, methallyl, allyl, 2 - hydroxypropyl - 3 - phenoxy, 1 - allyloxy-2-hydroxypropyl, and para-chlorobenzyl. Other hydrophobic reagents capable of reacting monofunctionally with ungelatinized granule starch to form an ether bond are suitable for the present process.

The etherification reaction may be conducted in suitable liquids such as alcohols, ketones, toluene, etc., or it may be conducted in water if suitable conditions are used to prevent starch granule gelatinization during early stages of the reaction. Reactions in water are preferred because of economy, simplicity of equipment and the hazards involved. Broadly, the process in water involves forming a suspension of ungelatinized starch in water with the etherifying agent and adding soluble alkali, such as sodium or potasium hydroxide in an amount sufficient to promote etherification of the starch. During the early stages of the reaction, a limited amount of alkali is used to avoid swelling of the starch. Swelling inhibitors such as alkali metal salts may be added to prevent swelling by the aqueous alkali. The amount of alkali preferred during the early stages of the process will range from 0.5%–5.0% based on starch solids.

Suitable proportions of salt are from 1%–26% based on the water in the suspension. Neutral salts such as sodium chloride or sodium sulfate are preferred. The temperature maintained during the reaction may range from 70°–140° F., and a range of 110° F.–125° F. is preferred. As the starch becomes substituted with hydrophobic groups it, at first, is more susceptible to swelling in aqueous alkali. However, as the degree of substitution is raised it becomes increasingly insoluble in water. Higher proportions of alkali may then be added to increase the rate of etherification. Proportions of etherifying agents ranging from 0.09 to 0.50 mole per $C_6H_{10}O_5$ mole of starch have been found to be suitable for the production of hydrophobic starches for the present process. A range of from 0.11 to 0.30 mole per $C_6H_{10}O_5$ mole of starch (viz anhydroglucose unit) is preferred. The required substitution levels can also be stated in terms of weight percent of the hydrophobic groups, but this will vary with the molecular weight of the particular hydrophobic group. Using benzyl as a reference, the etherified starches can contain from 5% to 20% by weight of the hydrophobic groups, and preferably from about 9% to 15% by weight. More generally, the etherification of the starch should be continued until the resulting granule starch is so hydrophobic and resistant to gelatinization that it will settle out of a 6% suspension in neutral water after cooking therein for 30 minutes at 210° F. This simple test will indicate that the starch granules as a whole have been made hydrophobic. The starch after etherification to a high degree with hydrophobic agents can be neutralized and washed free of salts and side reaction products on a filter. The product is obtained in the form of enlarged granules which are substatnially in soluble in water even at elevated temperatures.

As already indicated, hydrophobic starch granules of this invention resist gelatinization under normal starch cooking conditions. They settle out after heating in water to the boiling point and have substantially no adhesive or filming properties. The new discovery has been made that these insoluble products can be dispersed to a hydrophobic sol capable of forming films with high dry adhesive strentgh if they are heated in water at superatmospheric pressure and suddenly released to atmospheric conditions. This process fragments or fractures the starch, the resulting particles being dispersed in the water. These hydrophobic particles are so small that they resist centrifugation and will pass through filter paper. The subgranule particles are of submicron size, that is, they have an average size of less than 0.1 micron, and are generally in the submicron range. For example, the majority of the particles may have a size of less than 0.1 micron averaging from about 0.03 to 0.05 micron. Such particles therefore exhibit colloidal properties. The suspension obtained has properties similar to those of emulsions or latices. They are very low in viscosity, very cloudy and opaque, and when spread on a surface and dried they coalesce to form strong, clear, and smooth continuous fillms. The hydrophobic suspensions are non-sticky and have extremely low water binding character. The dried films show increased water resistance and are relatively non-tacky at high humidities.

Suitable conditions for fragmenting and dispersing the hydrophobic starches of this invention advantageously involve the use of superatmospheric pressures and temperatures above the boiling point of water. A convenient process for fragmenting and dispersing hydrophobic starches is that described in U.S. Patent 3,133,836 of Winfrey and Black, wherein, starch suspensions are forced into steam at 50–100 p.s.i.g. and then suddenly flashed to the atmosphere. More generally, any continuous pressure cooker capable of cooking starch at an elevated pressure and corresponding temperature can be used. Preferably, the cooker is operated with the turbulence achieving by using excess steam above the theoretical, as described in said Patent 3,133,836.

The concentration of the dispersion can vary over a wide range. The fragmented starch can comprise from as little as 1% by weight on a dry basis up to 40%–50% of the dispersion. For most uses dispersions of 2%–10% solids will be suitable.

The hydrophobic starch dispersion of this invention have several distinct advantages when used in certain commercial applications. The very low viscosity of such dispersions make them advantageous for use as binders in starch/clay coating colors for paper coating. Because of their low viscosity combined with high film-forming and dry adhesive bonding capability, high solids coating colors can be prepared which still have the required flowability and result in high coating pick values and increased wet-rub resistance when applied to paper and paperboard surfaces and dried. The hydrophobic starch dispersions are advantageous in commercial applications which require minimized size migration during drying, for example, as internal binders in ceiling tile and wall board and as spin finishes for glass fiber filament yarns to minimize migration of the size or finish to the surface of the wound cheese of the sized glass fiber yarns during drying. These hydrophobic starch dispersions are also advantageous in commercial applications which require low viscosity and ability to form continuous, glossy films with reduced tackiness at high humidities, for example, in floor polishes and wall or floor cleaners.

Because of their low viscosity at relatively high solids concentrations these hydrophobic starch dispersions are better adapted to spraying processes than are the normal hydrophilic starch pastes. This makes them advantageous for use in aerosol type formulations or in other applications involving spraying of starch, such as spraying starch size on the wet cellulosic web during paper manufacturing.

Other advantages and uses of this type of product will be apparent to those skilled in starch technology and applications of starch.

The preferred embodiments of the invention are further illustrated by the following examples.

EXAMPLE 1

Fifty pounds of commercial starch slurry containing 44.4% dry solids was diluted with water to about 35.5% dry solids starch concentration at a temperature of 37.5° C. A solution containing 6.05 pounds of sodium sulfate and 0.78 pounds of sodium hydroxide dissolved in 24 pounds of water and cooled to room temperature was added to the starch slurry over a period of one hour. Benzyl chloride was added in increments equal to 10% of the starch solids. The reaction mixture temperature was raised to 50–52° C. and maintained throughout the reaction. Progress of the reaction was followed by titration of 10 gram portions of the mixture with standard acid. As the alkali level was reduced through reaction with the benzyl chloride more alkali was added. However, the alkali level was maintained at a lower level than at the early part of the reaction to avoid swelling the starch. Later, as substitution increased, the alkali level could again be raised to approximately the original level without causing the starch to swell. Additions to the reaction mixture of alkali and swelling inhibitor are shown in Table A.

TABLE A.—ADDITIONS TO REACTION MIXTURE

| Hours | Benzyl chloride (lb.) | Alkali (lb. sodium hydroxide) | Swelling inhibitor (lb. sodium sulfate) |
|---|---|---|---|
| 0 | 2.2 | 0.87 | 6.05 |
| 24 | 2.2 | 0.44 | 1.7 |
| 25 | | 0.35 | |
| 51 | 1.1 | 0.35 | |

Reaction was continued until a cumulative titer of 38.2 ml. of 0.1 N acid was reached. The alkali concentration of the reaction mixture varied as stated above and at 0, 24, 45 and 51 hours the 10 gram titer was 19.8 ml., 17.5 ml., 12.9 ml. and 18.3 ml. respectively. This shows that progressively lower amounts of total alkali were present as the reaction progressed, but toward the end of the reaction the alkali content could again be increased because the starch had been substituted to a degree where swelling was no longer the problem that it was in the middle area of substitution.

During the reaction the granules were observed in the microscope to lose some of the character of normal corn starch granules. They became more rounded than irregular and were increasingly translucent at the edges with subsequent loss of birefringence in many granules as evidenced by the disappearance of the crosses as viewed through crossed Nicol prisms.

At the end of approximately 90 hours, the starch reaction mixture was adjusted to about pH 6 with hydrochloric acid. The product was dewatered on a filter and resuspended and washed three times with water. Filtering was normal and there was no noticeable odor of benzyl chloride remaining. This was, apparently, due to having a relatively high level of alkali present during the latter stage of the reaction thus allowing all the reagent to be used. No lachrymating effects were observed on handling the product during washing in an open room.

The benzyl-substituted granule starch had a D.S. of 0.19 (9.74% substituted).

EXAMPLE 2

About 6 grams of the starch-benzyl chloride reaction product of Example 1 was suspended in 94 grams of water at pH 6.5 and cooked in a steam bath with occasional stirring for a total of 30 minutes. During the cook no viscosity developed, and the granules were all intact and only slightly swollen as determined microscopically. Normal starch would develop considerable viscosity and granule rupture would have occurred when cooked under the same conditions.

The starch-benzyl chloride reaction product was suspended in water in 10% concentration and passed through the continuous pressure cooker at 300° F. using three times excess steam in a manner described in U.S. Patent 3,133,836. At the end of the cook, the solids concentration was 7.7%. The cooked starch-benzyl chloride product appeared as an emulsion in that it had no increased viscosity and the granule structure had completely disappeared. Microscopically there appeared only very tiny particles which were sphere shaped. The cooked product was opaque but with a bluish cast and when swirled in a glass bottle, would cling to the side and slowly return to the body of the dispersion. There was no detectable settling of the cooked product over a period of several months indicating that any retrogradive tendencies of the original corn starch had been completely overcome. The cooked product was cast onto a glass plate using a Boston-Bradley blade set at .006 inch; in a few minutes of drying at room temperature, the aqueous phase evaporated and a clear continuous film of starch remained suggesting that the spheroid particles had coalesced and were cohesive enough to form a film.

The film had considerable adhesion to the glass plate and was very difficult to remove at high humidity. Exposure to 100% humidity for several hours was required to soften the film suggesting that a high degree of water resistance had been imparted to the cooked starch product. Thus the starch product which had water resistance in the granule state and would not cook out under normal conditions could be dispersed by means of special cooking conditions to render it hydrophilic enough to remain in water as an emulsion-like material and then form a water resistant film once the particles had coalesced and the water phase had been removed.

An indication that the satisfactory cooking condition had been reached for the starch product was determined by subjecting a portion of the above cooked emulsion-like paste to additional cooking at 50 p.s.i.g. for 10 minutes in an autoclave. The product was opaque and emulsion-like but had a definite layer of settled material. Small pieces would also float to the top of the paste. The sample appeared more cooked out than the non-autoclaved portion.

Further indication of the physical state of the emulsion-like starch dispersion was obtained by passing it through a paper filter and finding complete passage through the filter. A portion of the starch dispersion was centrifuged for 10 minutes at 2000 r.p.m. after which it was observed that there was no sediment in the bottom of the tube. Likewise, a portion of the starch dispersion was diluted with an equal volume of water and subjected to centrifuging at 2000 r.p.m. for 10 minutes. Again, there was no sediment in the tube thus suggesting that in the continuous pressure cooked starch dispersion, water is apparently the continuous phase and further confirms its emulsion-like state. The starch "paste" has become more a function of the substituent added than of starch as it is normally known.

A further study of the fragmented starch product was made. A drop of the starch "emulsion" was placed on polished chrome plate and observed through a dark field microscope. Photographs were taken and the praticle size compared to standard latex samples when the film was projected onto a large screen. A range of particle sizes was observed with the larger particles being about 0.05 micron and the smaller sizes small enough to be subject to Browian movement. The majority of the particles approached 0.03 to 0.05 micron.

EXAMPLE 3

Forty seven pounds of commercial starch slurry containing 42.6% dry solids was treated with water, sodium sulfate, and sodium hydroxide. Benzyl chloride was added and the reaction was continued in the same manner as in Example 1 except that successive additions of sodium hydroxide were made by diluting approximately 30% sodium hydroxide solution with about an equal weight of saturated aqueous sodium chloride solution. By observing the same precautions of avoiding high alkali concentration during the middle area of substitution it was possible to use a lower cost swelling inhibitor and obtain the same product. Reaction was continued to a cumulative titer of 64.1 ml. of 0.1 N acid thus effecting a higher substitution than in Example 1.

The benzyl-substituted granule starch had a titer of 64.1, and a D.S. of 0.385 (17.6% substituted).

Cooking experiments were again conducted at atmospheric pressure using 6 grams of starch in 94 grams of water at pH 6.5. After 30 minutes on the steam bath with occasional stirring, the starch granules settled out and no viscosity was formed.

Cooking of the starch product was done using 10% aqueous suspension and passing it through the continuous pressure cooker at 300° F. and three times excess steam. The resulting paste had no apparent increased viscosity and appeared much like the product described in Example 2 except that a layer settled from the paste in a few hours. Because of the higher substitution and the presence of granules still retaining their crosses a more vigorous cooking was suggested. A portion of the paste was subjected to further heating by autoclaving at 50 p.s.i.g. for 10 minutes. The product of this additional cooking did not settle out and gave all the properties of an emulsion-like product found in the previous example which had been pressure cooked but not autoclaved. This includes forming clear continuous films, having a bluish cast and having infrared spectra with absorption peaks at identical places. These results further confirm that the amount of substitution, and the degree of cooking can be adjusted to yield a desirable emulsion-like product.

EXAMPLE 4

A guantity of 800 grams of corn starch was slurried in 1165 grams of water. A solution containing 28 grams of sodium hydroxide and 232 grams of sodium sulfate dissolved in 925 grams of water was cooled to room temperature and added to the starch slurry over a period of about one hour. Allyl chloride was added and the reaction mixture stirred at 110° F. The progress of the reaction was followed by titrating 10 gram portions of the reaction mixture with 0.1 N HCl. As the alkali level was reduced through reaction with the allyl chloride, more alkali was added by using equal weight portions of 50% sodium hydroxide and saturated sodium chloride solution. The same technique as described previously was used to avoid swelling the starch in the middle substitution range. Reaction was continued to a cumulative titer of 84.6 ml.

The hydrophobic starch product had a D.S. of 0.46 which is equivalent to 10.5% substitution. A portion of the sample was cooked at 6% concentration in neutral water at 99° C. for 30 minutes and developed no viscosity. However, continuous pressure cooking at 10% concentration yielded a dispersion with properties similar to that described in Example 2.

EXAMPLE 5

About 140 grams of sodium sulfate was dissolved in 700 grams of water and 580 grams of potato starch (13.8% moisture) added. Ten grams of sodium hydroxide dissolved in 56 grams of water was cooled to room temperature and added dropwise to the vortex of the stirred starch slurry slowly so as to avoid any localized swelling. Fifty grams of phenyl glycidyl ether was added, and the reaction mixture was stirred at 125° F. for a total of 44 hours. It was then neutralized to pH 6, filtered and washed once by resuspending in water. Filtering was extremely rapid. The starch product was air dried.

The hydrophobic starch product had a D.S. of 0.11, which is equivalent to 8.4% substituted. The hydrophobic group was 2-hydroxypropyl-3-phenoxy.

A portion of the starch product was suspended in 6% concentration in water and cooked on the steam bath with occasional stirring for 120 minutes. No viscosity developed as would be expected with normal starch, and the starch settled out from the slurry. Microscopically the granules appeared enlarged but apparently did not swell to yield the cohesive paste character of a normal starch.

A portion was continuous pressure cooked as in Example 2. The product had the emulsion-like properties of previous samples and the suspension was stable for several days.

EXAMPLE 6

Five hundred grams of starch was slurried into 750 grams of 99% isopropyl alcohol and 150 grams of water added. A solution of 33.3 grams of 30% by weight sodium hydroxide was added dropwise to the slurry at the vortex of the vigorously stirring mixture so as to avoid localized swelling and insure uniform mixing of the alkali with the starch. One hundred twenty five grams of allyl glycidyl ether was added, and the mixture reacted at 137–139° F. for 16 hours. After this time, the pH was adjusted to about 6 with phosphoric acid and the product recovered on the filter. It was washed by resuspending once in water, and after filtering it was air dried.

The hydrophobic granule starch had a D.S. of 0.092, which is equivalent to 6.11% substituted. The hydrophobic group was 1-allyloxy-2-hydroxypropyl.

A portion of the sample was cooked at 6% concentration in water at 99° C. for 30 minutes. During this time, no viscosity developed. Normally, under these conditions starch would result in a thick cohesive paste.

Another portion was cooked in 10% concentration in the continuous pressure cooker as described in Example 2. The resulting product was emulsion-like and had the characteristics of the pressure cooked material described in Example 2.

EXAMPLE 7

One thousand one hundred grams of 9% moisture corn starch was slurried with 1500 grams of 99% Isopropanol. To this slurry was added 100 grams of solid sodium hydroxide in the form of flakes. The sodium hydroxide was allowed to dissolve, with vigorous agitation, for two hours at room temperature, then sufficient water, 185 grams was added very slowly with vigorous agitation, to bring the total water to 300 grams or 30% of the weight of the dry starch. The remaining alkali then dissolved in approximately one half hour, and 332 grams of benzyl chloride was added. An initial titer was taken with .1 N hydrochloric acid. The reaction suspension was then put in a stirrer equipped Erlenmeyer flask and allowed to react for 44 hours in a 120° F. water bath. The water bath temperature was raised to 140° F. and the sample was allowed to react an additional 51 hours.

The benzyl-substituted starch had a D.S. of 0.14 (7.54% substituted).

The cooking procedure described in Example 2 was used and similar results were observed. The cooked starch/benzyl product appeared as an emulsion in that it had very little increased viscosity, and the granule structure had disappeared. Other comments in Example 2 apply to this example.

EXAMPLE 8

To a water slurry of corn starch, containing 1000 grams of starch and 1515 grams of water, was added 380 grams of sodium sulfate. Then a mixture of 24% sodium sulfate solution and 30% sodium hydroxide, containing 76 grams of sodium sulfate and 50 grams of sodium hydroxide, was added slowly with vigorous agitation. Methallyl chloride, 100 grams, was added and an initial titer, 10 grams of slurry equal 34.7 cc. of .1 N hydrochloric acid, was recorded. The suspension was put in a stirrer-equipped Erlenmeyer flask and allowed to react 52 hours in a 120° F. water bath. The titer drop was recorded after 52 hours and an additional mixture of salt and caustic, 225 grams of 24% sodium sulfate and 111 grams of 30% sodium hydroxide, was added as before. An additional 100 grams of methallyl chloride was added and the titer drop was recorded after another 48 hours at 120° F. This step was repeated once more, whereupon, the total titer drop indicated the hydrolysis of 20.6% methallyl chloride on the dry starch.

This product, like that of Example 1, was cooked in a 6% commercial concentration on the steam bath, however, the starch would not gelatinize.

The product did form an emulsion-like product when pressure cooked as described in Example 2. The other comments in Example 2, such as, the formation of a continuous film, passing it through a filter paper, and centrifuging for 10 minutes at 2000 r.p.m. all apply to this example also.

EXAMPLE 9

To a water slurry of corn starch, containing 750 grams of starch and 1270 grams of water, was added a mixture of 20% sodium sulfate (954 grams) and 30% sodium hydroxide (75 grams). This mixture was added carefully to the vortex of the highly agitated starch slurry. Para, alpha-dichlorotoluene, 75 grams, was added and an initial titer was taken as indicated in Example 8. The suspension was placed in a stirrer-equipped Erlenmeyer flask and allowed to react 49 hours at 125° F. in a water bath. The salt, caustic and para, alpha-dichlorotoluene addition was repeated as described above with the exception that only 477 grams of 20% sodium sulfate was added. This sample was allowed to react an additional 48 hours at 125° F.

The para-chlorobenzyl substituted starch had a D.S. of 0.134 (9.35% substituted). The unique characteristics observed with pressure cooking were quite apparent in this sample also.

A portion of the product was centrifuged as described in Example 2 and found to have identical characteristics and properties as did the benzyl derivative.

EXAMPLE 10

Potato starch was stirred into water to yield 1510 grams of slurry containing 33% solids. A solution containing 15 grams of sodium hydroxide and 181 of sodium sulfate dissolved in 725 grams of water was cooled to room temperature and added slowly to the starch slurry over a period of about one hour. Benzyl chloride (175 grams) was added in separate increments and the mixture allowed to react at 120° F. in the manner of Example 1 until a titer of 39.7 ml. was reached. The progress of the reaction was followed by titration of 10 gram portions of the mixture with standard acid. Precautions such as those described in Example 1 were observed to prevent swelling of the starch throughout the reaction. At the end of the reaction the mixture was neutralized to about pH 6 with sulfuric acid and the product dewatered on a filter after which it was resuspended and washed three times with water.

During the reaction the granules lost some of their natural appearance in that they became enlarged and many of the granules were observed to lose much of the birefringence normally seen in potato starch granules when viewed through crossed Nicol prisms. Although the granules were enlarged, no filtering difficulties were encountered.

The benzyl-substituted starch had a D.S. of 0.20 (9.92% substituted).

Cooking experiments were conducted at atmospheric pressure using 6 grams of starch derivatives in 94 grams of water at pH 6.5. After 30 minutes on the steam bath with occasional stirring, the starch granules had settled out and no viscosity was formed.

The starch derivative was cooked in a continuous pressure cooker in the same manner as described in Example 2. A non-tacky, emulsion-like suspension resulted which had all the properties of the product of Example 2. The suspension was stable for several days after which a layer began to settle from the suspension indicating that a slightly higher substitution would allow the suspension to maintain its emulsion-like property for a much longer period of time. The data suggest that potato starch requires a higher degree of substitution than does corn starch to achieve an equal degree of dispersion when cooked under the same conditions.

While in the foregoing specifications, this invention has been described in relation to preferred embodiments thereof, and many details have been set forth for the purpose of illustration, it will be apparent to those skilled in the art that the invention is susceptible to additional embodiments without departing from the basic principle of the invention, and that certain of the details set forth herein can be varied considerably.

We claim:
1. A film-forming starch dispersion consisting essentially of a dispersion of subgranule starch particles in water, said particles having an average size of less than 0.1 micron and exhibiting colloidal properties, said starch particles being colloidal fragments of a non-gelatinized hydrophobic granule starch containing from .09 to .5 moles of ether-linked hydrophobic groups per mole of starch, said hydrophobic groups being selected from alkyls of 3 to 12 carbons and aralkyls of 7 to 12 carbons.

2. The starch dispersion of claim 1 in which said hydrophobic group is benzyl.

3. The starch dispersion of claim 1 in which said hydrophobic group is methallyl.

4. The starch dispersion of claim 1 in which said hydrophobic group is allyl.

5. The starch dispersion of claim 1 in which said hydrophobic group is an alkyl of 3 to 6 carbons.

6. The starch dispersion of claim 1 in which said hydrophobic group is an aralkyl of 7 to 9 carbons.

7. A film-forming starch dispersion consisting essentially of a dispersion of subgranule starch particles in water, said particles having an average size of about 0.03 to 0.05 microns, said starch particles being colloidal fragments of a nongelatinized hydrophobic granule starch containing from 0.11 to 0.3 moles of ether-linked hydrophobic groups per mole of starch, consisting of benzyl, methallyl, allyl, alkyls of 3 to 6 carbons, and aralkyls of 7 to 9 carbons.

8. Hydrophobic non-gelatinizable starch dispersible in water as submicron sized particles to provide a film-forming dispersion, consisting essentially of non-gelatinized granule starch containing at least .09 but not substantially over 0.3 moles of monofunctionally ether-linker hydrophobic groups per mole of starch, said hydrophobic groups being selected from hydroxyl-free alkyls of 3 to 12 carbons and hydroxyl-free aralkyls of 7 to 12 carbons, and said granule starch being further characterized by settling out of a 6% suspension in neutral water after cooking therein for 30 minutes at 210° F.

9. The hydrophobic starch of claim 8 in which said hydrophobic group is benzyl.

10. The hydrophobic starch of claim 8 in which said hydrophobic group is an aralkyl of 7 to 12 carbons.

11. The hydrophobic starch of claim 8 in which said hydrophobic group is an aralkyl of 7 to 9 carbons.

12. Hydrophobic non-gelatinizable starch dispersible in water as submicron sized particles to provide a film-forming dispersion, consisting essentially of non-gelatinized granule starch containing from about 0.11 to 0.3 moles of a monofunctionally ether-linked hydrophobic group per mole of starch, said hydrophobic group being a hydroxyl-free aralkyl of 7 to 9 carbons, said granule starch being further characterized by settling out of a 6% suspension in neutral water after cooking therein for 30 minutes at 210° F.

13. The hydrophobic starch of claim 12 in which said hydrophobic group is benzyl.

References Cited

UNITED STATES PATENTS

| | | | |
|---|---|---|---|
| 3,135,739 | 6/1964 | Hjermstad et al. | 260—233.3 |
| 2,858,305 | 10/1958 | Kerr | 260—233.3 |
| 2,740,724 | 4/1956 | Wrigley et al. | 106—213 |
| 2,707,689 | 5/1955 | Wilde | 117—84 |

DONALD E. CZAJA, Primary Examiner

M. J. WELSH, Assistant Examiner

U.S. Cl. X.R.

106—210; 117—100; 127—71; 260—233.3